United States Patent [19]

Watanabe

[11] Patent Number: 5,513,054
[45] Date of Patent: *Apr. 30, 1996

[54] DISC APPARATUS HAVING IMPROVED CONSTRUCTION FOR GUIDING MOVEMENT OF OPERATING MEMBER FOR DISC ROTATION

[75] Inventor: Takashi Watanabe, Ichikawa, Japan

[73] Assignee: Teac Corporation, Tokyo, Japan

[*] Notice: the term of this patent shall not extend beyond the expiration date of Pat. No. 5,291,356.

[21] Appl. No.: 430,128

[22] Filed: Apr. 25, 1995

Related U.S. Application Data

[63] Continuation of Ser. No. 142,495, Oct. 22, 1993, abandoned.

[30] Foreign Application Priority Data

Nov. 6, 1992 [JP] Japan ................................. 4-297302

[51] Int. Cl.$^6$ ........................... G11B 17/04; G11B 17/022
[52] U.S. Cl. .................................... 360/99.06; 360/99.02; 369/77.2
[58] Field of Search .................... 360/99.06, 99.02; 369/77.2

[56] References Cited

U.S. PATENT DOCUMENTS

| | | | |
|---|---|---|---|
| 4,604,666 | 8/1986 | Kitahara et al. | 360/99.06 |
| 4,719,526 | 1/1988 | Okita et al. | 360/99.06 |
| 4,724,497 | 2/1988 | Takeda et al. | 360/99.06 |
| 4,740,937 | 4/1988 | Watanabe | 360/99.06 |
| 5,060,101 | 10/1991 | Isomura | 360/99.06 |
| 5,291,356 | 3/1994 | Matsumoto et al. | 360/99.06 |

FOREIGN PATENT DOCUMENTS

| | | | |
|---|---|---|---|
| 59-077666 | 5/1984 | Japan | 360/99.06 |
| 60-079553 | 5/1985 | Japan | 360/99.06 |
| 62-158661 | 10/1987 | Japan | |
| 04-245059 | 9/1992 | Japan | |

*Primary Examiner*—John H. Wolff
*Assistant Examiner*—Craig A. Renner
*Attorney, Agent, or Firm*—Michael N. Meller

[57] ABSTRACT

A holder has inserted therein a cartridge containing a disc. A sliding member has an operating member, wherein the sliding member slides along a direction in response to insertion of the cartridge into the holder so as to move the holder into a loading position, wherein the sliding member slides along another direction in response to operation of the operating member by a user so as to move the holder into a insertion/ejection position, and wherein the disc apparatus accesses the disc in a condition in which the holder is in the loading position and a user either takes out the cartridge from the disc apparatus or inserts a cartridge containing a disc into the disc apparatus in a condition in which the holder is in the insertion/ejection position. A guiding portion guides the movement of the operating member by engaging a side of the operating member, wherein the side of the operating member comprises a part approximately located at a side end of the operating member if a disc-surface direction refers to a horizontal direction, the disc-surface direction being a direction along which a recording surface of a disc extends when a cartridge containing the disc is inserted in the holder, and wherein the guiding member guides the vertical movement of the operating member, the vertical movement being a movement along a direction substantially perpendicular to the disc-surface direction.

8 Claims, 18 Drawing Sheets

FIG. IA
PRIOR ART
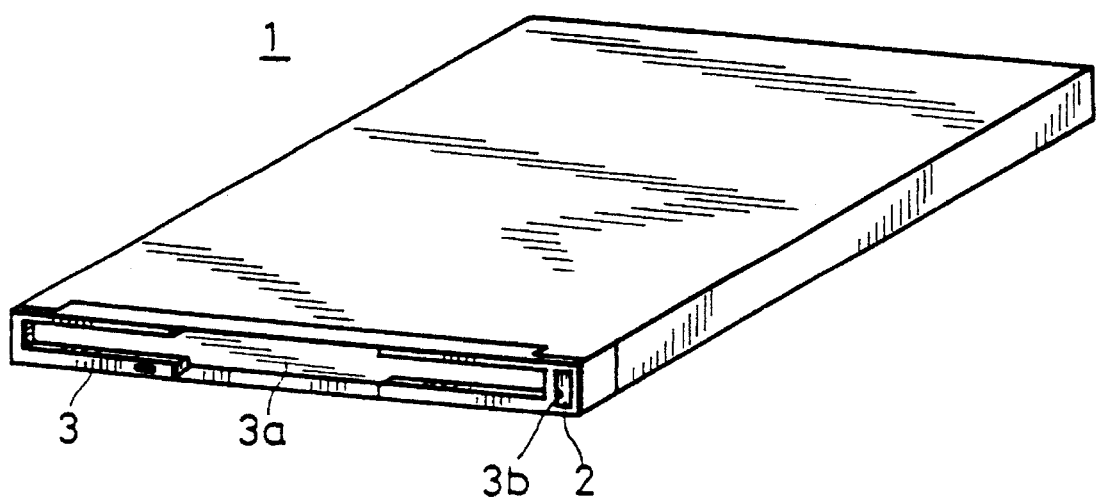
FIG. IB
PRIOR ART
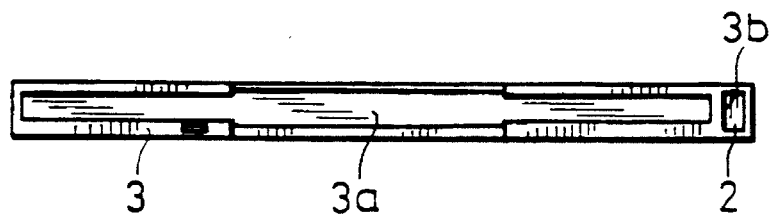

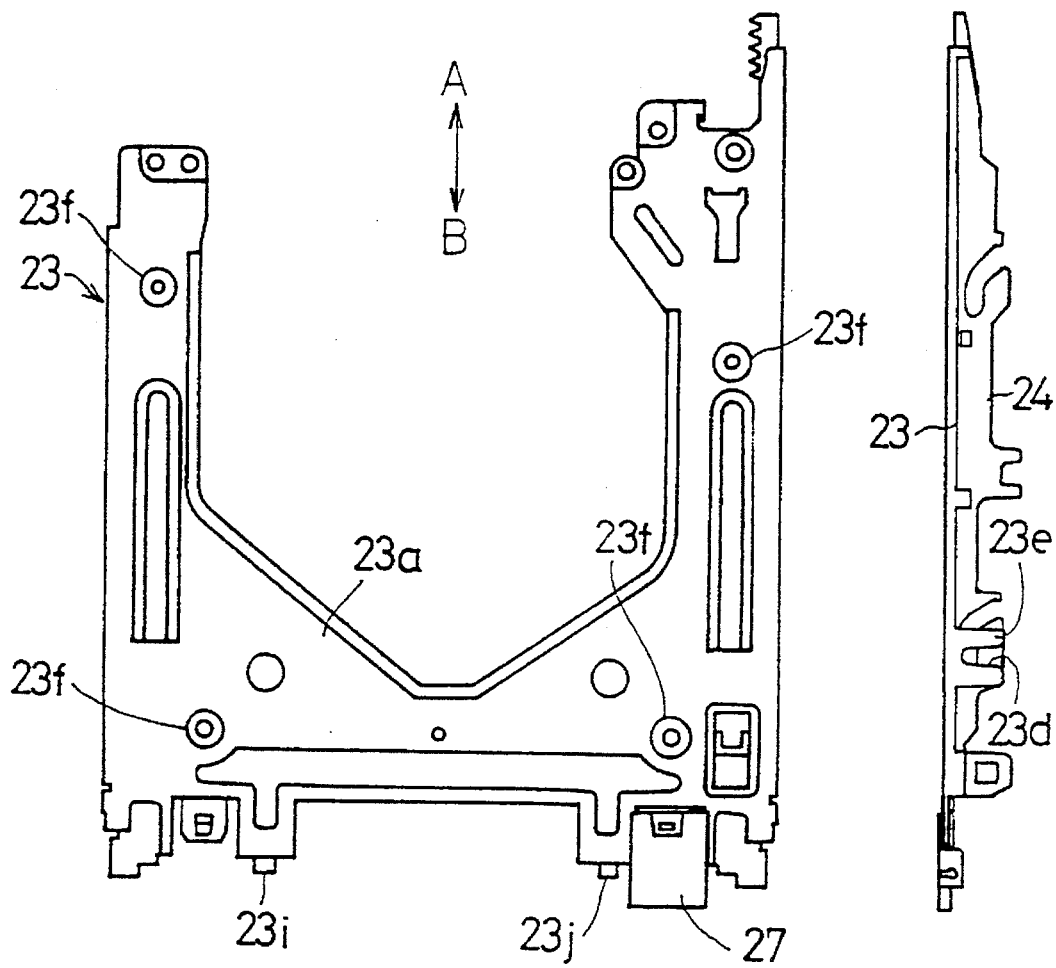
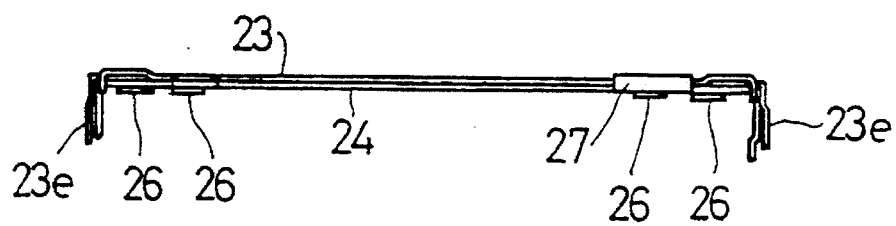

DISC APPARATUS HAVING IMPROVED CONSTRUCTION FOR GUIDING MOVEMENT OF OPERATING MEMBER FOR DISC ROTATION

This application it a continuation of application Ser. No. 08/142,495, filed Oct. 22, 1993, now abandoned.

BACKGROUND OF THE INVENTION

The present invention relates to a disc apparatus, and in particular to a disc apparatus having a construction enabling reduction in thickness thereof and miniaturization in dimensions thereof.

An example of a magnetic disc apparatus according to related art is described below, with reference to FIGS. 1A, 1B, 2 and 3.

The magnetic disc apparatus 1 of these drawings has an ejecting button 2 for ejecting a magnetic disc cartridge (referred to simply as a "cartridge" hereinafter) which has been inserted therein. This ejecting button 2 is located in the front of the disc apparatus 1. A front bezel 3 is provided in the front of the apparatus 1. The front bezel 3 is provided with a disc inserting hole 3a and an ejecting-button guiding hole 3b.

The ejecting button 2 is inserted through the guiding hole 3b, which hole is formed by cutting out an appropriate part of the front bezel 3. Thus, movement of the ejecting button 2 is guided by the guiding hole 3b so that the ejecting button 2 may slidingly move on the internal surface of the hole 3b only along appropriate directions. The ejecting button 2 is fixed to a fixing portion 4a projecting from a front end of a slider 4. The slider 4 slides in response to a movement of the cartridge, movement by which movement the cartridge is inserted in the disc apparatus 1.

Such a movement of the slider 4, which movement comprises forward and backward movements in the drawings, is linked with a movement of a holder (not shown in the drawings) into which the cartridge is directly inserted. The slider 4 moves forward in response to the cartridge being inserted. As a result, the ejecting button 2 projects from the front face of the front bezel 3. Simultaneously, the holder is moved into a cartridge loading position. Then, when the ejecting button 2 is pushed by an operator, that is, when an ejecting operation is carried out, the slider 4 is moved. As a result of this movement of the slider 4, the holder is moved into a cartridge insertion/ejection position.

The ejecting button 2 is at the following respective positions corresponding to each state of the disc apparatus mentioned above. While the holder is at the cartridge loading position, the ejecting button 2 is projected forward from the ejecting-button guiding hole 3b of the front bezel 3 as shown in FIG. 3. In contrast to this, while the holder is at the cartridge insertion/ejection position, the ejecting button 2 is pulled into the disc apparatus 1 through the guiding hole 3b as shown in FIG. 1A.

As shown in the drawings, the ejecting button 2 is located on the right side of the disc inserting hole 3a and not at the top/bottom thereof in the disc apparatus 1. Such arrangement enables a reduction in the thickness of the disc apparatus 1. However, in addition to such a reduction in thickness of the disc apparatus, a reduction in width of the disc apparatus is also required recently due to a technical advance in the field of such a disc apparatus. Due to this advance, it is required that various office automated equipment units such as a personal computer and a word processor be miniaturized. This miniaturization requirement accordingly requires the miniaturization of such a disc apparatus (reduction in width as well as thickness thereof) employed in these office automated equipment units.

Thus, it has been proposed to locate the ejecting button 2 at the top of the hole 3a, instead of on the right side of the inserting hole 3a, so as to reduce the width of the disc apparatus 1.

However, locating the button 2 on the top of the insertion hole 3a results in the thickness of the disc apparatus 1 being significantly increased. In order to prevent such an increase in thickness, it is necessary to remove a part of the front bezel 3, which part is located on the top of the ejecting-button guiding hole 3b. However, this part to be removed acts to guide the movement of the ejecting button 2 so as to make it only move in the appropriate directions and to prevent the ejecting button 2 from moving undesirably upward/downward, in particular, upward. Thus, the removing of this part of the front bezel may result in an upward fluctuation of the ejecting button 2 while the ejecting button 2 is being moved forward/backward. As a result, the removing of the part of the front bezel may result in instability in the forward/backward sliding movement of the ejecting button 2.

SUMMARY OF THE INVENTION

An object of the present invention is to provide a disc apparatus obtained by, for example, modifying a construction of a disc apparatus according to the related art such as that of the disc apparatus 1 mentioned above. The obtained disc apparatus has a construction by which a width of the disc apparatus can be reduced without increasing its thickness and the forward/backward movement of the ejecting button 2 can be kept stable.

To achieve the object of the present invention, the disc apparatus according to the present invention comprises:

a holder for inserting therein a cartridge containing a disc;

a sliding member having an operating member, wherein said sliding member slides along a direction in response to insertion of said cartridge into said holder so as to move said holder into a loading position, wherein said sliding member slides along another direction in response to operation of said operating member by a user so as to move said holder into a insertion/ejection position, and wherein said disc apparatus accesses said disc in a condition in which said holder is in said loading position and a user either takes out said cartridge from said disc apparatus or inserts a cartridge containing a disc into said disc apparatus in a condition in which said holder is in said insertion/ejection position; and a guiding portion for guiding the movement of said operating member by engaging a side of said operating member, wherein said side of said operating member comprises a part approximately located at a side end of said operating member if a disc-surface direction refers to a horizontal direction, said disc-surface direction being a direction along which a recording surface of a disc extends when a cartridge containing said disc is inserted in said holder, and wherein said guiding member guides the vertical movement of said operating member, said vertical movement being a movement along a direction substantially perpendicular to said disc-surface direction.

By any of the above constructions, the forward/backward movement of the ejecting button 2 can be kept stable, even though the above mentioned part of the front bezel 3, which part is located at the top of the ejecting-button guiding hole 3b, is removed.

Other objects and further features of the present invention will become more apparent from the following detailed description when read in conjunction with the accompanying drawings.

BRIEF DESCRIPTION OF THE DRAWINGS

FIGS. 1A and 1B show a perspective view of a magnetic disc apparatus according to related art;

FIGS. 7A, 7B and 7C show, respectively a plan view, side elevation view and front elevation view of a cover member, slider and ejecting button of the disc apparatus of FIG. 4 in a state where they are assembled together;

DESCRIPTION OF THE PREFERRED EMBODIMENTS

Figure 2:
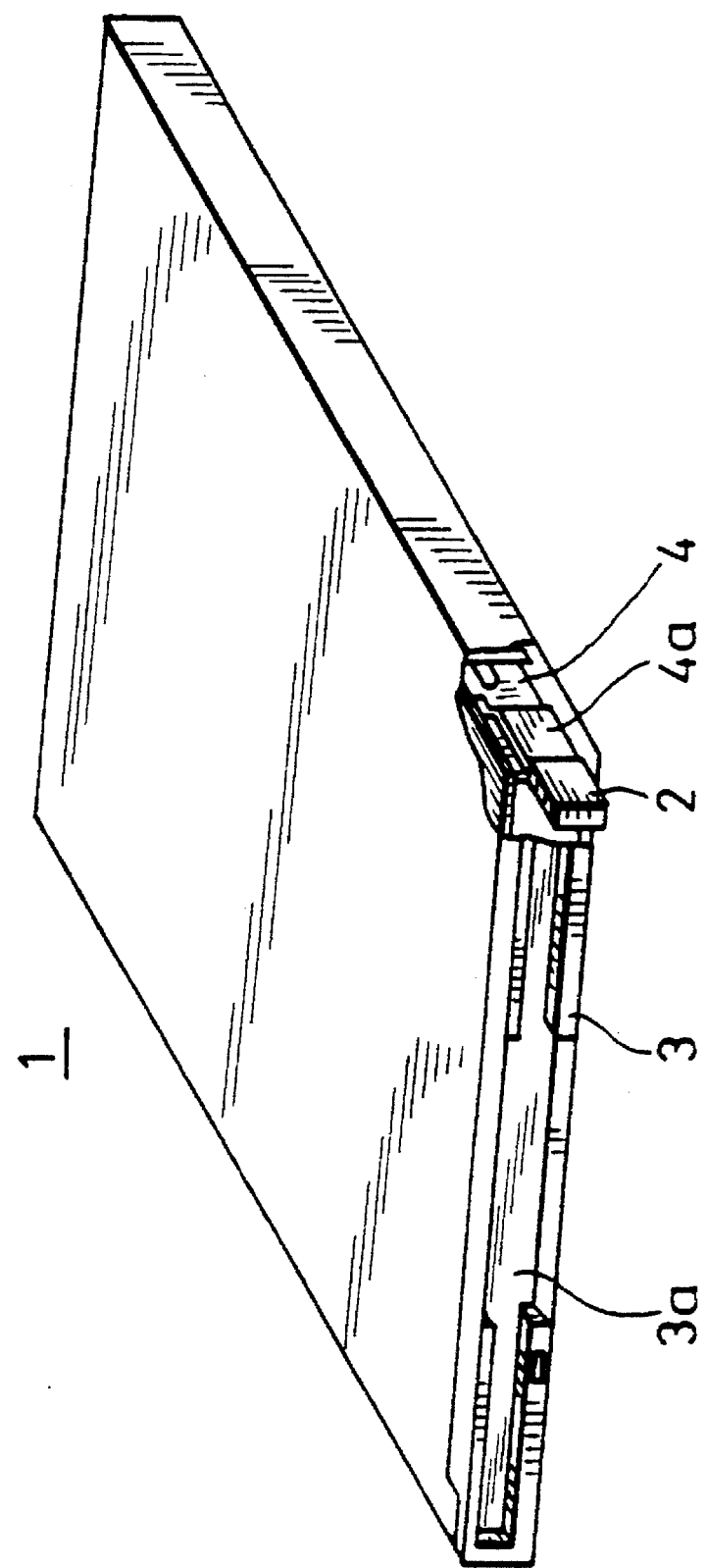
FIG. 2 shows a perspective view of the disc apparatus of FIGS. 1A and 1B, and in particular indicates a construction therein associated with an ejecting button.
Figure 3:
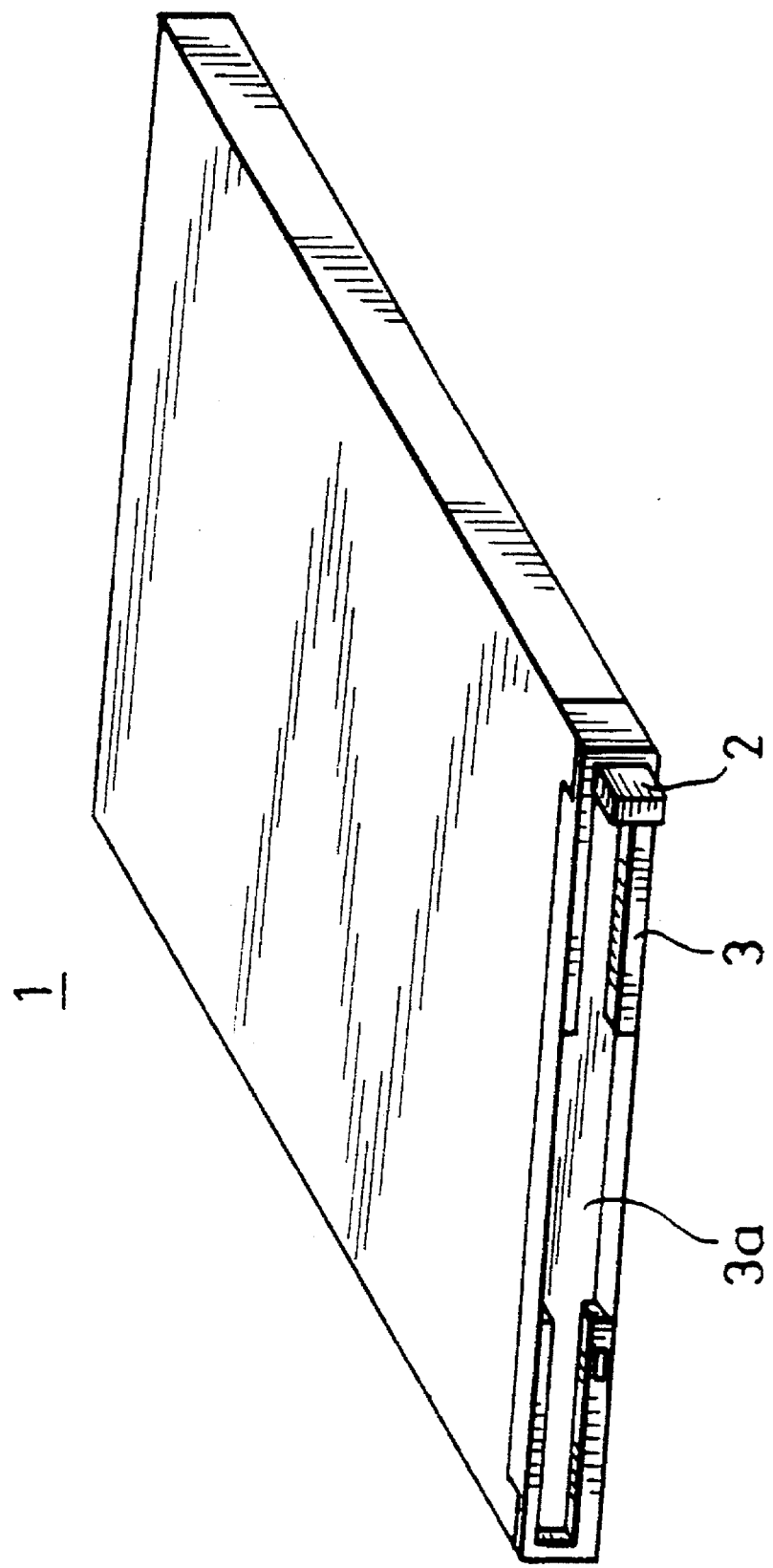
FIG. 3 shows a perspective view of the disc apparatus of FIGS. 1A and 1B, in a state where a cartridge has already been ejected from the apparatus or in a state where a cartridge has not yet been inserted into the apparatus.
Figure 4:
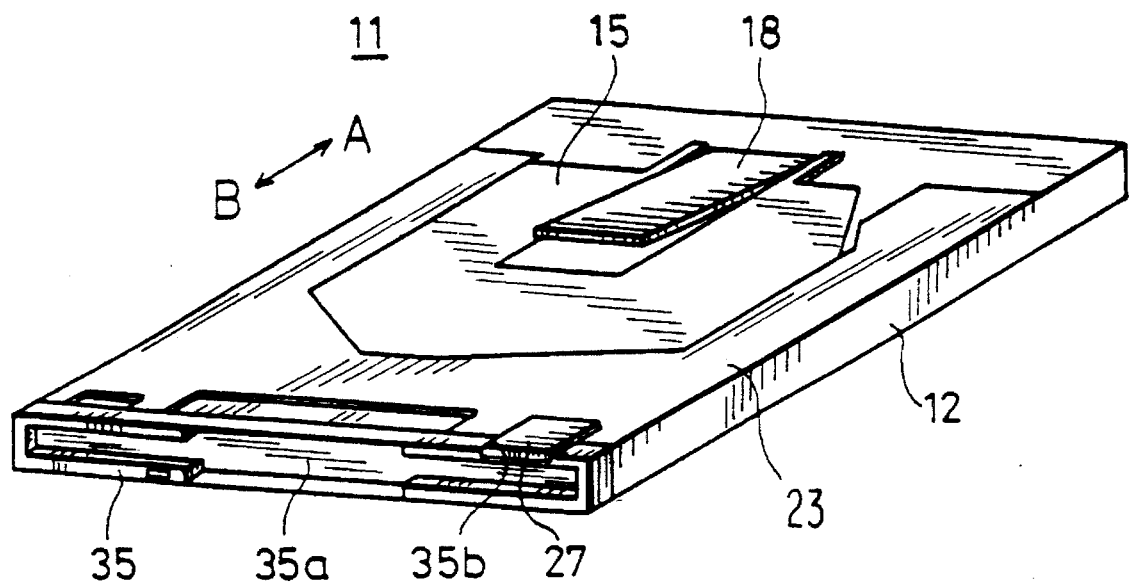
FIG. 4 shows a perspective view of one embodiment of a magnetic disc apparatus according to the present invention.
Figure 5:
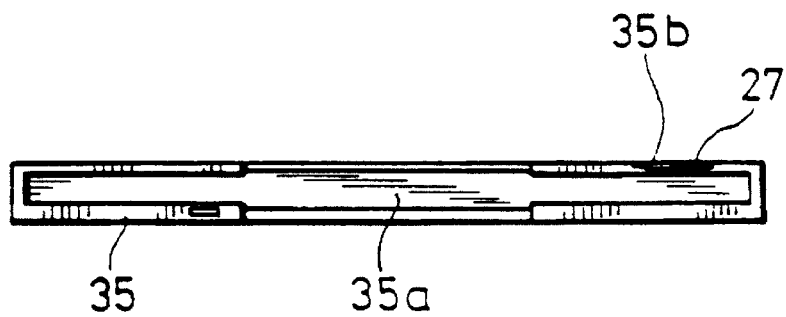
FIG. 5 shows a front view of the disc apparatus of FIG. 4.

An embodiment of a magnetic disc apparatus according to the present invention will now be described with reference to FIGS. 4, 5, 6, 7A, 7B, 8C, 8, and 9. It should be noted that indication of a cover member 23 described below is omitted in FIG. 6.

A magnetic disc apparatus 11 of these drawings is provided with an ejecting button 27 located at a top part of a front bezel 35, that is, located at the top of a disc inserting hole 35a. The ejecting button 27 is inserted into a concavity 35b provided at a top part of the front bezel 35 so that the button 27 can slide therethrough as described below.

The front bezel 35 of the disc apparatus 11 has such dimensions that the width and thickness thereof are smaller/less than those of a front bezel in a conventional disc apparatus. Further, the thickness or height of the front bezel 35 is equal to that of the front bezel 3 of the above-mentioned disc apparatus 1 of the related art and the width of the front bezel 35 is smaller than that of the front bezel 3 of the disc apparatus 1. Thus, the magnetic disc apparatus 11 which is obtained is a result of the other kinds of disc apparatus being miniaturized as well as the thickness thereof being reduced.

Figure 6:
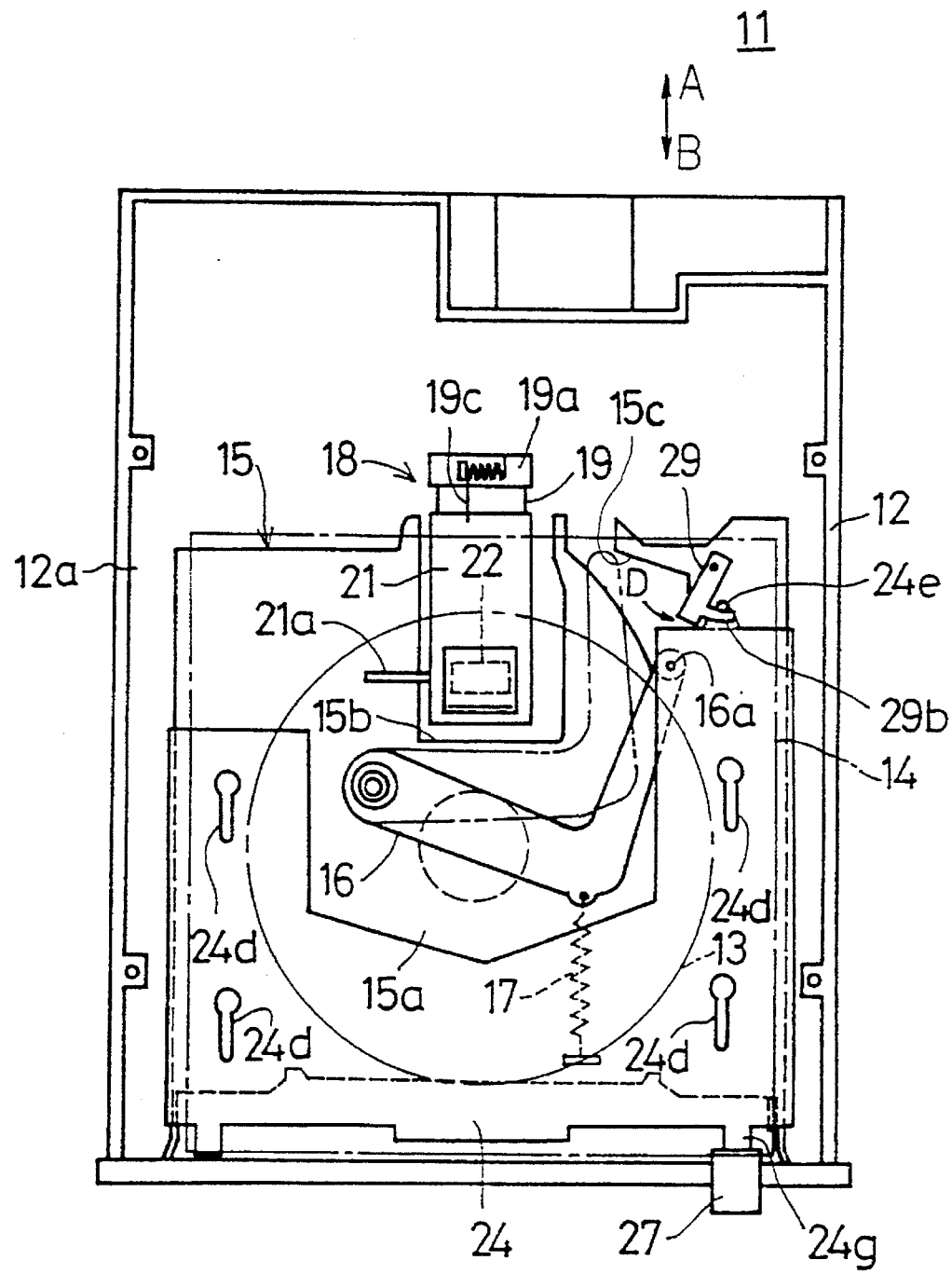
FIG. 6 shows a plan view of the disc apparatus of FIG. 4.

A holder 15 is provided on a frame 12 of the disc apparatus 11, into which holder a cartridge 14 is directly inserted. In FIG. 6, the cartridge 14 is indicated by a chain line. A flexible magnetic disc 13 is contained in the cartridge 14.

Figure 8:
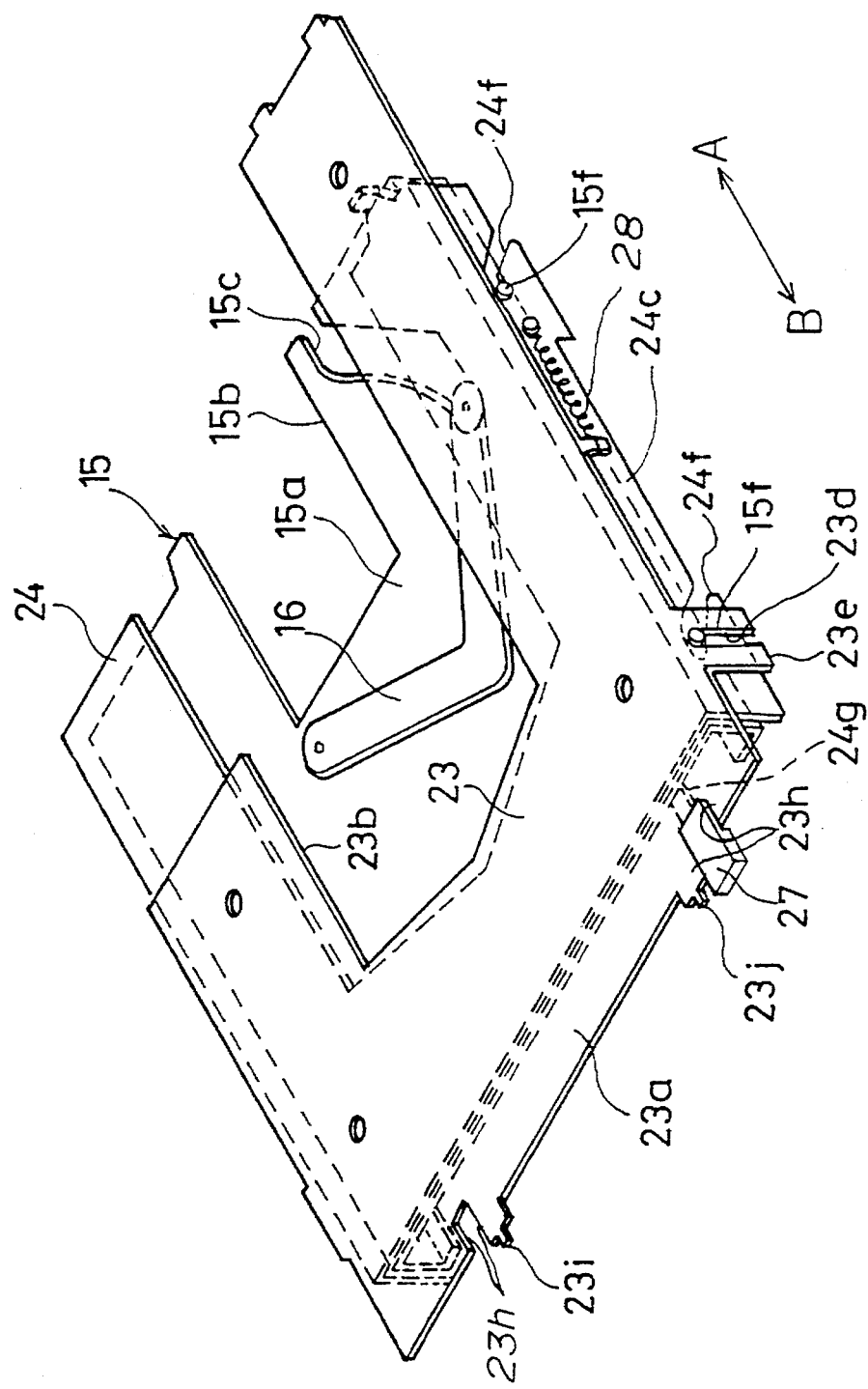
FIG. 8 shows a perspective view of the cover member, slider and a holder of the disc apparatus of FIG. 4 in a state where they are assembled together.

The holder 15 will now be described, with reference to FIGS. 8 and 9. The holder is lowered in response to a loading operation and is lifted in response to an ejecting operation. The loading operation is an operation by which the cartridge 14 is loaded in the disc apparatus 11 and the ejecting operation is an operation by which the cartridge 14 loaded in the disc apparatus 11 is then ejected therefrom. An opening 15b is provided on a top plate 15a of the holder 15, through which the opening 15b a magnetic head unit 18 passes through. A shutter lever 16, having a shape like the letter L, is supported on the top plate 15a of the holder 15 so that the shutter lever 16 can pivot on the top plate. The lever 16 acts to open a shutter (not shown in the drawings) of the cartridge 14 in response to the above-mentioned loading operation.

The shutter lever 16 is biassed in the counter-clockwise direction in FIG. 6 by a pulling force of a spring 17. Pivoting of the lever 16 in this counter-clockwise direction makes the above-mentioned shutter of the cartridge 14 closed during the above-ejecting operation. An engaging pin 16a is provided on the free end of the lever 16, the pin 16a being provided for engaging the shutter of the cartridge 14. The engaging pin 16a downward projects into the holder 15 through an arc-shape opening 15c formed on the holder 15, the opening 15c being formed by cutting out an appropriate part of the holder 15.

Figure 10:
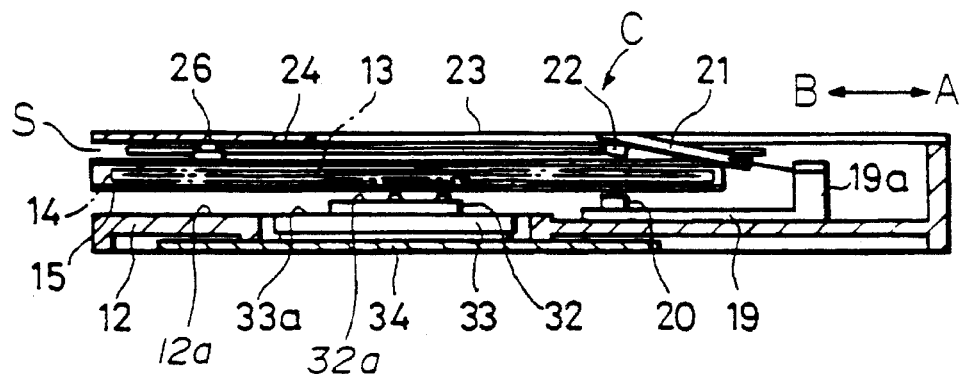
FIG. 10 shows a side elevational sectional view of the disc apparatus of FIG. 4 in a state where a cartridge has been inserted therein.

As shown in FIGS. 6 and 10, the above-mentioned magnetic head unit 18 comprises a carriage 19, a lower magnetic head 20, a head arm 21 and an upper magnetic head 22. The carriage 19 is mounted on the frame 12 so that the carriage 19 can move in radial directions A and B of the flexible disc 13 while the cartridge 14 is loaded in the disc apparatus 11. The lower magnetic head 20 is mounted on the top surface of the left end (in FIG. 10) of the carriage 19. The head arm 21 is supported on an end (right end in FIG. 10) portion 19a of the carriage 19 so that the head arm 21 can pivot with respect to the portion 19a. The upper magnetic head 22 is mounted on the bottom surface of the free end (left end in FIG. 10) of the head arm 21.

The carriage 19 is engaged by a leading screw (not shown in the drawings) through threads thereof, which leading screw is appropriately driven by a stepping motor (not shown in the drawings). The carriage 19 moves either in the direction A or in the direction B on the frame 12 in response to turning of the leading screw. As a result, the magnetic heads 20 and 22 are moved along a tracking direction of the magnetic disc 13.

The head arm 21 is biassed in a direction C shown in FIG. 10 by a pushing force of a torsion spring 19c provided on the end portion 19a. As shown in FIG. 6, an abutting portion 21a projects leftward from the side of the head arm 21. The top plate 15a of the holder 15 is in contact with the abutting portion 21a. By this construction, before the cartridge 14 is inserted into the holder 15, the arm 21 is lifted by being pushed by means of the abutting portion 21a fixed on the holder 15 which is rising. As a result, the upper magnetic head 22 is moved apart from the lower magnetic head 20.

The cover member 23 is secured on the frame 12 by means of screws which are threaded in respective screw holes (not shown in the drawings) formed on the frame 12. The location of the thus secured cover member 23 is such that the cover member 23 covers the top of the holder 15. The cover member 23 will now be described with reference to FIGS. 7A, 7B, 7C, 11, 12A, 12B and 12C. The cover member 23 comprises a plane portion 23a and a cut-out portion 23b. The plane portion 23a has a shape like the letter U when viewed from the top. The cut-out portion 23b is used for preventing the cover member 23 from being engaged by the shutter lever 16.

Figure 11:
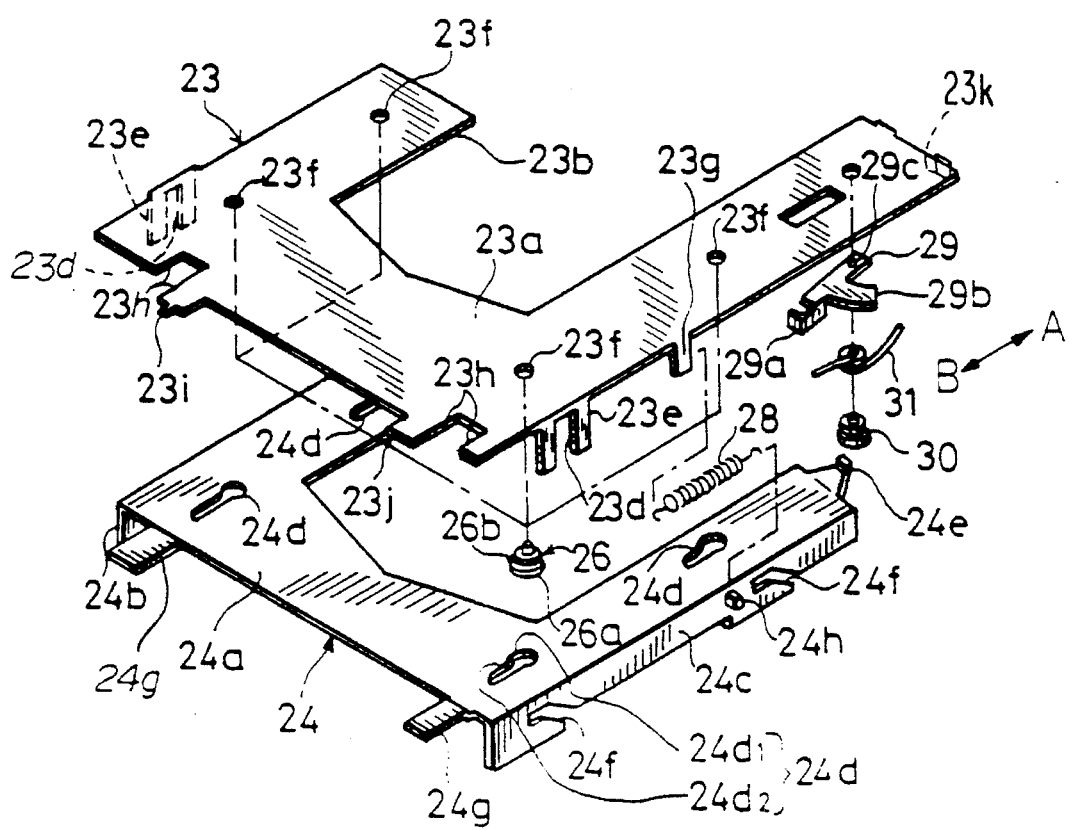
FIG. 11 shows an exploded perspective view of the cover member and slider of the disc apparatus of FIG. 4.

The cover member 23 further comprises guiding portions 23e and a spring fastening portion 23g. The guiding portions are as shown in FIG. 11. Each guiding portion 23e has a forked shape having a guiding cut-out 23d between the prongs thereof. The respective guiding portions 23e guide the upward/downward movement of the holder because the projecting pins 15f are fitted into the respective guiding cut-outs 23d. The projecting pins "15e" project from side walls "15d" and "15e" of the holder 15 as shown in FIG. 9. The spring fastening portion 23g projects downward from the side of the cover member 23 as shown in FIG. 11.

The cover member 23 is further provided with guiding portions 23h as shown in FIG. 11. The guiding portions 23h are formed by cutting out appropriate parts of the front end of the plane portion 23a of the cover member 23, resulting in a shape like a U letter with a square, rather than rounded, lower portion. The guiding portions 23h guide the movement of the ejecting button 27 so that the ejecting button 27 slides only along the directions A and B. Further, the guiding portions 23h guide the movement of the ejecting button 27 so as to prevent the ejecting button 27 from being shaken up and down. Further, the cover member 23 is provided with a pair of projections 23i and 23j which fix a vertical position of the front bezel 35 with respect to the frame 12 by being fitted into the bezel 35.

The slider 24 will now be described with reference to FIGS. 7A, 7B, 7C, 11, 13A, 13B and 13C.

Figure 12A:
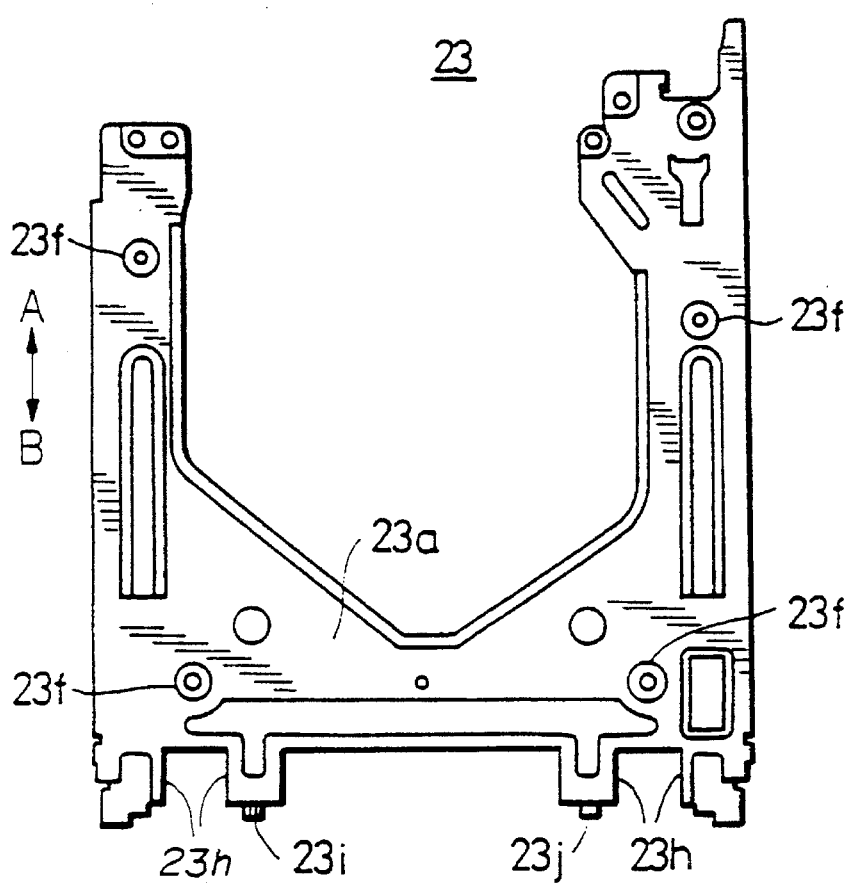
FIG. 12A, 12B and 12C respectively show a plan view, side elevation view and front elevation view of the cover member of the disc apparatus of FIG. 4.
Figure 12B:
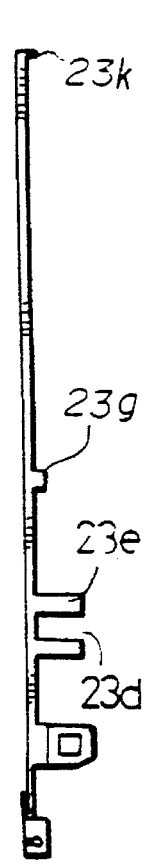

The slider 24 is sandwiched between the top plate 15a of the holder 15 and the cover member 23. The slider 24 comprises a top plate 24a having a letter U like shape as shown in FIG. 13A. The slider 24 also comprises left and right side plates 24b and 24c each formed by bending downward corresponding side edges of the top plate 24a. Four long holes 24d are formed on the top plate 24a, which respective holes are formed by cutting out appropriate parts of the top plate 24a, which holes extend lengthwise long along the directions A and B. Four guiding pins 26 are inserted though the corresponding long holes 24d, each of the guiding pins 26 being downward set in a respective one of four holes 23f formed in the top plate 23a of the cover member 23 as shown in FIGS. 12A, 12B and 12C.

Figure 12C:
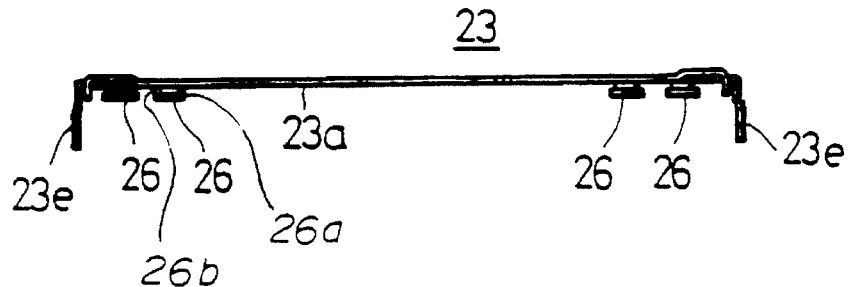
Figures 13A, 13B:
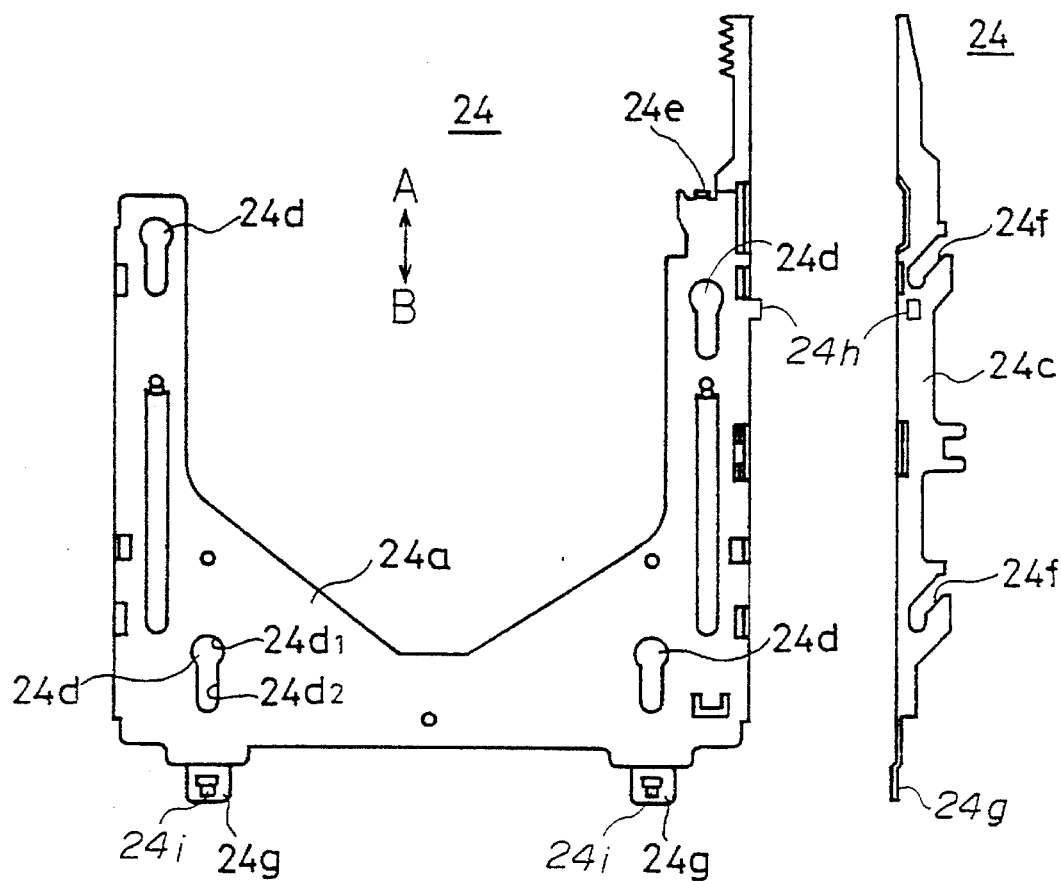
FIG. 13A, 13B and 13C respectively show a plan view, side elevation view and front elevation view of the slider of the disc apparatus of FIG. 4.
Figure 13C:
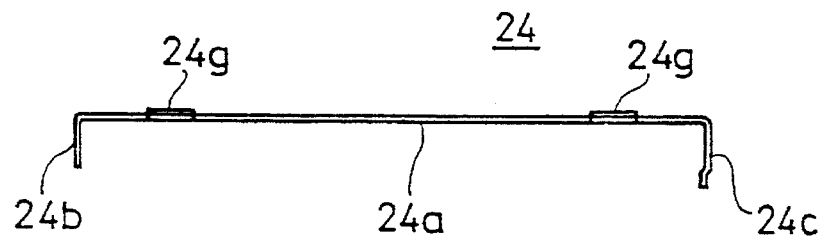

As shown in FIG. 12C, each guiding pin 26 comprises a large diameter portion 26a and a small diameter portion 26b. As shown in FIG. 13A, each long hole 24d comprises a circle hole 24d1 through which the large diameter portion 26a passes and a slit hole 24d2 on which the small diameter portion 26b slides. By employing these constructions of the long holes 24d of the slider 24 and the guiding pins 26 of the cover member 23, the slider 24 is hung on the cover member 23 through the long holes 24d and guiding pins 26. In this hanging state, the slider 24 can slide along the directions A and B. Further, as shown in FIG. 11, a spring fastening portion 24h projects rightward from the right side plate 24c.

Further, as shown in FIG. 11, an engaging nail 24e is provided at the rear end of the top plate 24a of the slider 24. The engaging nail 24e is formed by bending upward an appropriate part of the rear end of the top plate 24a. Four oblique slits 24f are formed in the side plates 24b and 24c of the slider 24. The respective four projecting pins 15f projecting from both sides of the holder 15 as shown in FIG. 9 are fitted into the respective oblique slits 24f. Further, as shown in FIG. 13A, a pair of ejecting-button mounting portions 24g project outwardly from the front end of the top plate 24a.

As shown in FIG. 13B, the ejecting button mounting portions 24g project along the direction B after being bent upward from the top plate 24a. By a construction in which the ejecting button 27 is mounted on one of the mounting portions 24g, the resulting position of the ejecting button is made to correspond to the position, higher than the position of the top plate 24a, of the guiding portions 23h of the cover member 23. Thus, the guiding portions 23h may be fitted on the ejecting button 27.

As shown in FIG. 13A, the mounting portions 24g provided at the right and left sides of the top plate 24a enhance the adaptability of the disc apparatus of the present invention as either the right side or left side of the top plate can be selected for mounting the ejecting button 27 thereon depending on a spatial design condition in the disc apparatus 11. As a result of the selection, either right side or left side of the mounting portion 24g may be used for mounting the ejecting button 27. Provision of the guiding portions 23h at both the sides corresponds to the above construction.

Figure 14A:
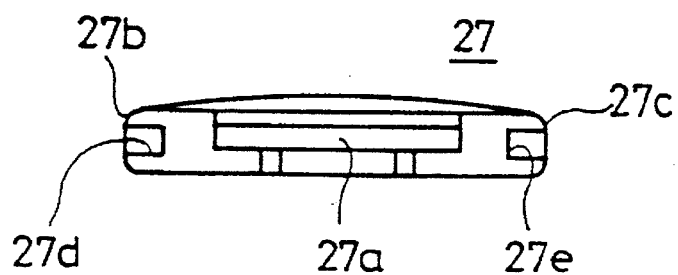
FIG. 14A, 14B and 14C respectively show a front elevation view, bottom view and side elevation view of the ejecting button of the disc apparatus of FIG. 4.
Figure 14B:
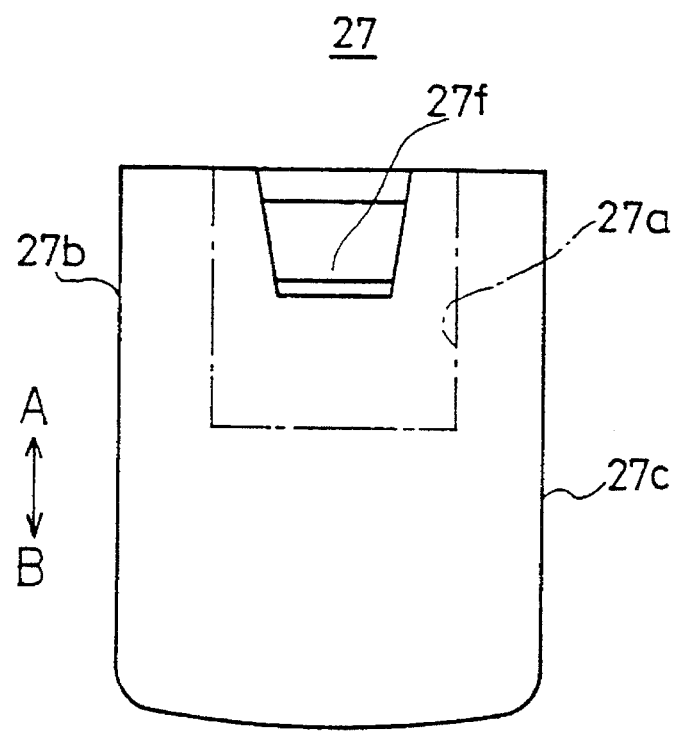
Figure 14C:
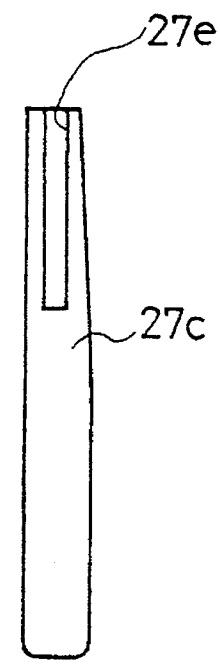

As shown in FIG. 14A, the ejecting button 27 is formed to be flat horizontally. Further, as shown in FIG. 14B, the ejecting button 27 has a mounting concavity 27a formed at the rear end thereof, into which concavity one of the ejecting-button mounting portion 24g is fitted. Further, as shown in FIGS. 14A and 14C, respective grooves 27d and 27e are formed on respective side surfaces 27b and 27c of the ejecting button 27. The right-side two portions among the four respective guiding portions 23h of the cover member 23 are fitted into the respective grooves 27d and 27e so that the ejecting button 27 may slide along the directions A and B.

Figure 17:
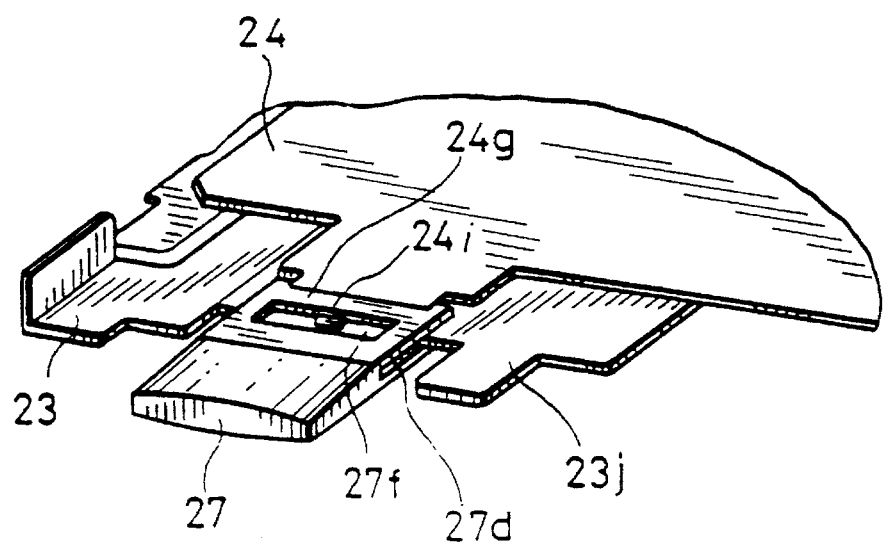
FIG. 17 shows a view after the view of FIG. 16 has been turned by 180°.

Further, as shown in FIG. 14B, a stopper portion 27f is formed on the button surface of the ejecting button 27 by hollowing out the appropriate part thereof. As shown in FIG. 17, a cut-and-raised portion 24i is formed on each of the mounting portions 24g, the cut-and-raised portion 24i being fitted into the stopper portion 27f of the ejecting button 27 so that the ejecting button 27 is fixed on the mounting portion 24g.

Figure 15:
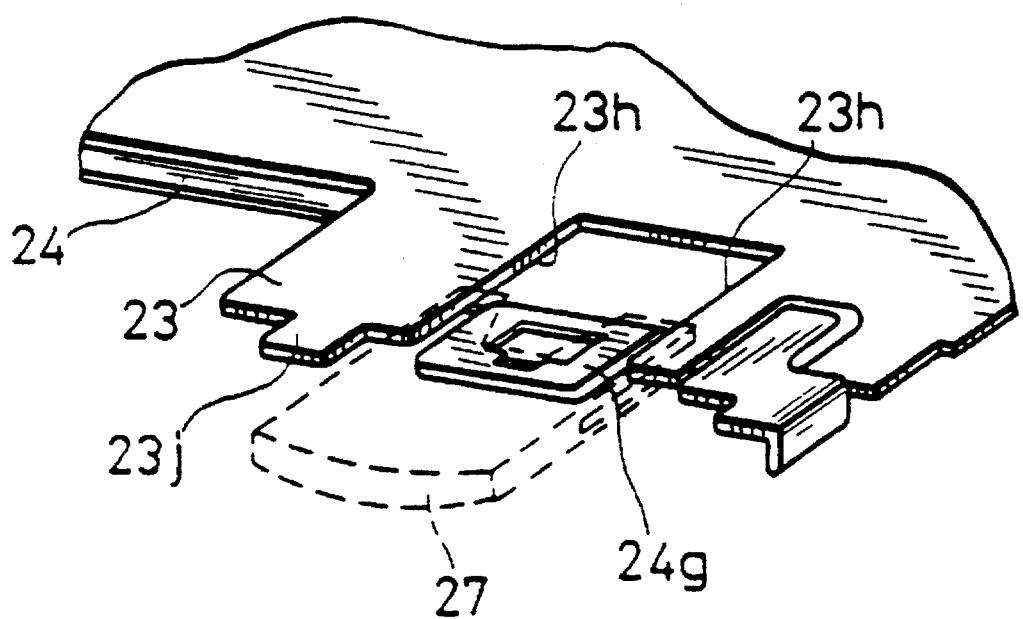
FIGS. 15 and 16 respectively show a perspective view of a front edge part of the slider and a front edge part of a cover member so as to indicate how the ejecting button is mounted on the slider and fitted onto the cover member.
Figure 16:
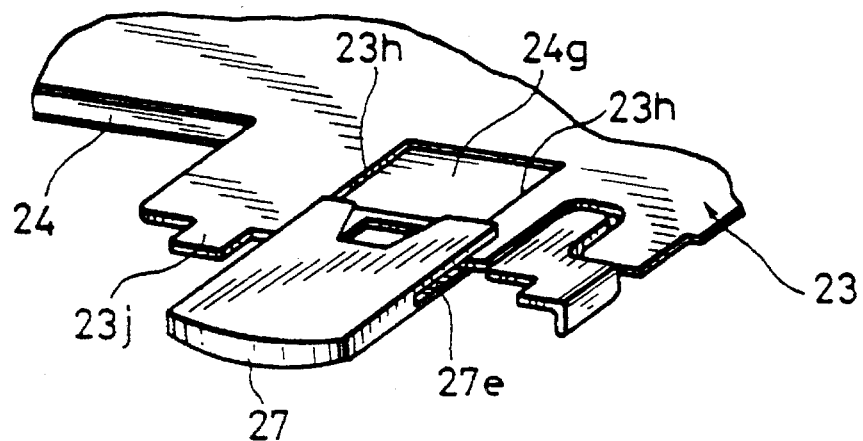

After the slider 24 is assembled below with the cover member 23 so that the slider 24 can slide with respect to the cover member as mentioned above, the ejecting-button mounting portion 24g is located between tile guiding portions 23h of the cover member 23 as shown in FIG. 15. Then, as shown in FIGS. 16 and 17, the ejecting button 27 is mounted on the cover member 23 as following manner. The ejecting-button mounting portion 24g is fitted into the mounting concavity 27a of the ejecting button 27. Simultaneously, the guiding portions 23h of the cover member 23 are fitted into the respective grooves 27d and 27e of the ejecting button 27. Further, as shown in FIG. 17, the secure fitting of the cut-and-raised portion 24i of the mounting portion 24g into the stopper portion 27f of the ejecting button 27 prevents the ejecting button 27 from dropping out from the cover member 23.

Figure 18A:
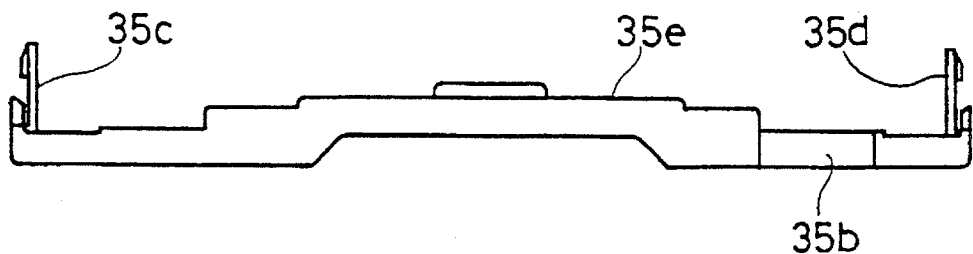
FIGS. 18A and 18B respectively show a plan view and front elevation view of a front bezel of the disc apparatus of FIG. 4.
Figure 18B:
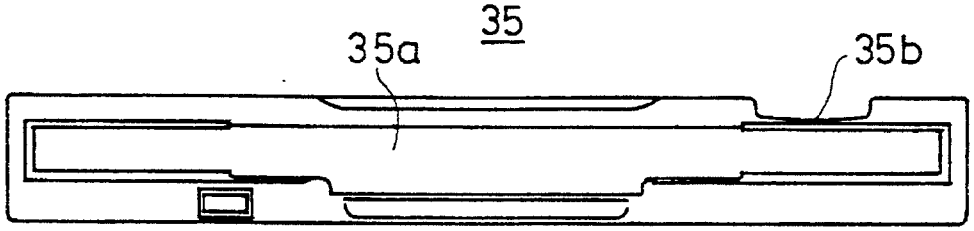

The construction in which the guiding portions 23h are loosely fitted into the grooves 27d and 27e of the ejecting button 27 offers the following advantages. First, the A/B directional sliding movement of the ejecting button 27 can be guided by the guiding portions 23h. Second, the vertical strength of the ejecting button 27 can be enhanced so that breaking of the ejecting button 27 is prevented, for example, even if a vertical mechanical shock is applied to the ejecting button 27. As a result, problems are prevented, which problems may occur if no member is provided on the top of the concavity 35b of the front bezel 35 as shown in FIGS. 18A and 18B. Consequently, the thickness of the disc apparatus 11 can be reduced.

Figure 19:
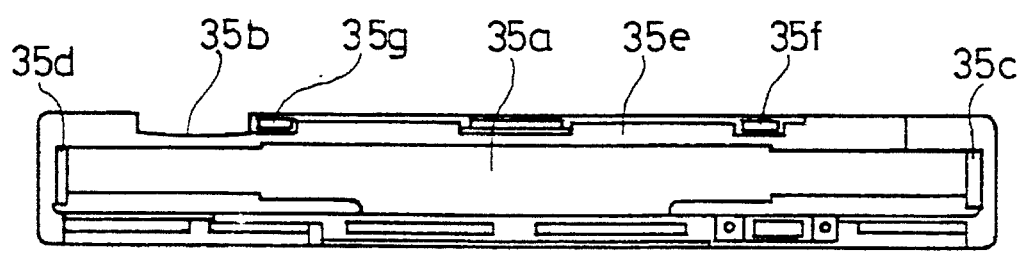
FIG. 19 shows a rear elevation view of the front bezel of FIGS. 18A and 18B.

As shown in FIGS. 18A, 18B and 19, the concavity 35b is located on the top of the front bezel 35. The ejecting button 27 is inserted into the concavity 35b. This construction is different from the construction of the disc apparatus 1 in the related art shown in FIGS. 1A and 1B by which the A/B directional sliding movement of the ejecting button 2 is guided by the guiding hole 3b. In contrast to the above construction of the disc apparatus 1 in the related art, in the disc apparatus 11 according to the present invention, the A/B directional movement of the ejecting button 27 is mainly guided by the guiding portions 23h of the cover member 23, as mentioned above. This construction makes it possible to eliminate any member such as a wall at the top of the concavity 35b for preventing the ejecting button 27 from being shaken upward. Consequently, the height of the front bezel as well as the width thereof can be reduced. Thus, miniaturization as well as a reduction in the thickness the disc apparatus can be achieved.

Figure 20:
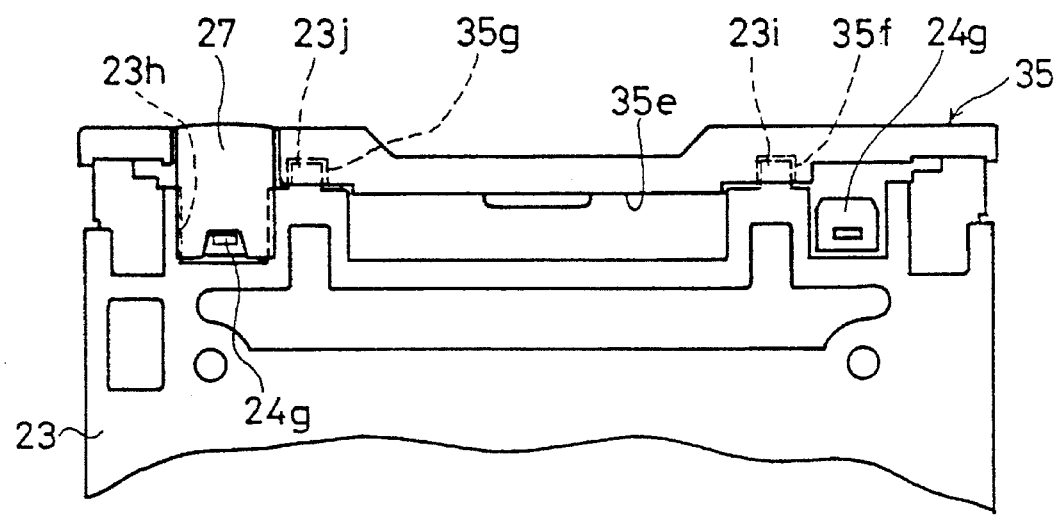
FIG. 20 shows a plan view of a front part of the cover member and the front bezel of the disc apparatus of FIG. 4 and in particular indicates a spatial relationship therebetween.

As shown in FIG. 18A, a pair of nails 35c and 35d project backward from both sides of the front bezel 35. These nails 35c and 35d are used for fixing the front bezel 35 to the frame 12. Further, a pair of engaging holes 35f and 35g are formed on the rear surface 35e of the bezel 35 to be located between the nails 35c and 35d. As shown in FIG. 20, the projection portions 23i and 23j are fitted into the respective engaging holes 35f and 35g to support the bezel on the cover member 23.

As mentioned above, the height of the bezel 35 is thus reduced as a result of there being no member at the top of the ejecting button 27. As a result of this height reduction, the strength of the part of the bezel 35 located at the top of the disc inserting hole 35a may be diminished. In order to substantially prevent such a diminishing in the strength of this part, the pair of projection portions 23i and 23j of the cover member 23 are provided to support the bezel 35 as mentioned above.

Figure 22:
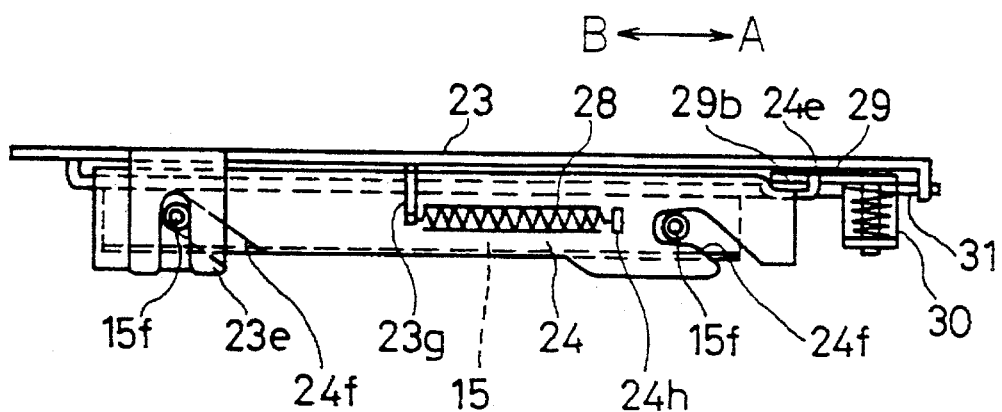
FIG. 22 shows a right-side elevation view of the cover member, slider and holder of the disc apparatus of FIG. 4.

As shown in FIG. 22, one end of a coil spring 28 for pushing the slider 24 in the direction B is fastened on the spring fastening portion 24h and the other end thereof is fastened on the spring fastening portion 23g of the cover member 23. By this construction, the slider 24 is in a state after moving in the direction B by a pulling force of the spring 28 while the cartridge 14 is being inserted into the disc apparatus 11. Then, when the ejecting button 27 is pushed by an operator during the ejecting operation, the slider 24 accordingly slides in the direction A.

A latch lever 29 is supported on the cover member 23 through a pin 30 downwardly extending from the bottom surface of the cover member 23 by securely fitting the pin 30 into the hole formed in the member 23 as shown in FIG. 11. By this construction, the latch lever 29 can pivot about the pin 30. The lever 29 comprises an abutting portion 29a, engaging portion 29b and hole 29c. The cartridge 14 comes in contact with the abutting portion 29a. The engaging portion 29b prevents, the movement of the engaging nail 24e of the slider 24 by engaging with the engaging nail. The pin 30 is inserted into the hole 29c.

A torsion spring 31 is wound around the pin 30, one end of the spring being fastened on the latch lever 29 and the other end thereof being fastened on a fastening portion 23k projecting downward from the rear end of the cover member 23 as shown in FIG. 11. By this construction, the spring 31 biases the latch lever 29 in a direction D (counter-clockwise) as shown in FIG. 6. As a result, the latch lever 29 pivots in the direction D in response to the movement of the slider 24 in the direction A in the ejecting operation. This pivoting of the latch lever 29 results in the engaging portion 29b engaging with the engaging nail 24e so as to prevent the movement of the slider 24. Thus, the slider 24 which has moved in the direction A in the ejecting operation as mentioned above is kept at a disc insertion/ejection position.

As shown in FIG. 10, before the cartridge 14 is inserted into the disc apparatus 11, the holder 15 is at the disc insertion/ejection position as a result of the holder 15 being lifted. By this lifting of the holder 15, the head arm 21 is also lifted together with the upper magnetic head 22 as a result of the abutting portion 21a of the head arm 21 being lifted by the top plate 15a of the holder 15. In order to allow the head arm 21 to be lifted as mentioned above, it is necessary to provide a space S between the holder 15 and the cover member 23. The space S can also be used to contain the slider 24. In other words, the slider 24 is provided in a manner in which it is contained in the space S.

In the related art, a part of the space provided to enable the upward movement of the magnetic head 22, the remaining part of the space S not being used. On the other hand, in the disc apparatus 11 according to the present invention, the remaining part of the space S is used for containing the slider As a result, the disc apparatus 11 can be designed so that the holder 15 can be brought lower with respect to the position of the frame 12 than is possible in the arrangement in the related art. This lowering of the holder 15 enables the thickness of the disc apparatus to be reduced.

In addition to containing the slider 24, the space S can be also used to contain therein the above-mentioned guiding pins 28 which project from the cover member 23 and which guide the A/B directional sliding of the slider 24. The space S is sufficient to allow the guiding pins 26 to perform their above-mentioned function in a manner similar to that of the arrangement of the related art. In other words, the guiding pins 26 can project downward sufficiently so as to ensure their ability to guide the A/B directional sliding of the slider 24 and so as to prevent the slider 24 from being removed from the guiding pins during this sliding action.

A turn table 32, onto which the magnetic disc 13 in the cartridge 14 loaded in the disc apparatus 11 is placed, turns at a constant rotational speed as a result of being driven by a motor 33. The motor 33 is mounted on a substrate 34 mounted on the bottom surface of the frame 12 as shown in FIG. 10. A driving coil (not shown in the drawings) is provided on the substrate 34 and the turn table 32 is mounted on a rotor 33a of the motor 33. Due to this construction of the motor 33 and turn table 32, as shown in FIGS. 9 and 10, wherein the motor 33 is mounted on the substrate 34 so that the motor 33 is buried in the bottom plate of the frame 12, a reduction in the thickness of the disc apparatus 11 can be achieved.

Figure 9:
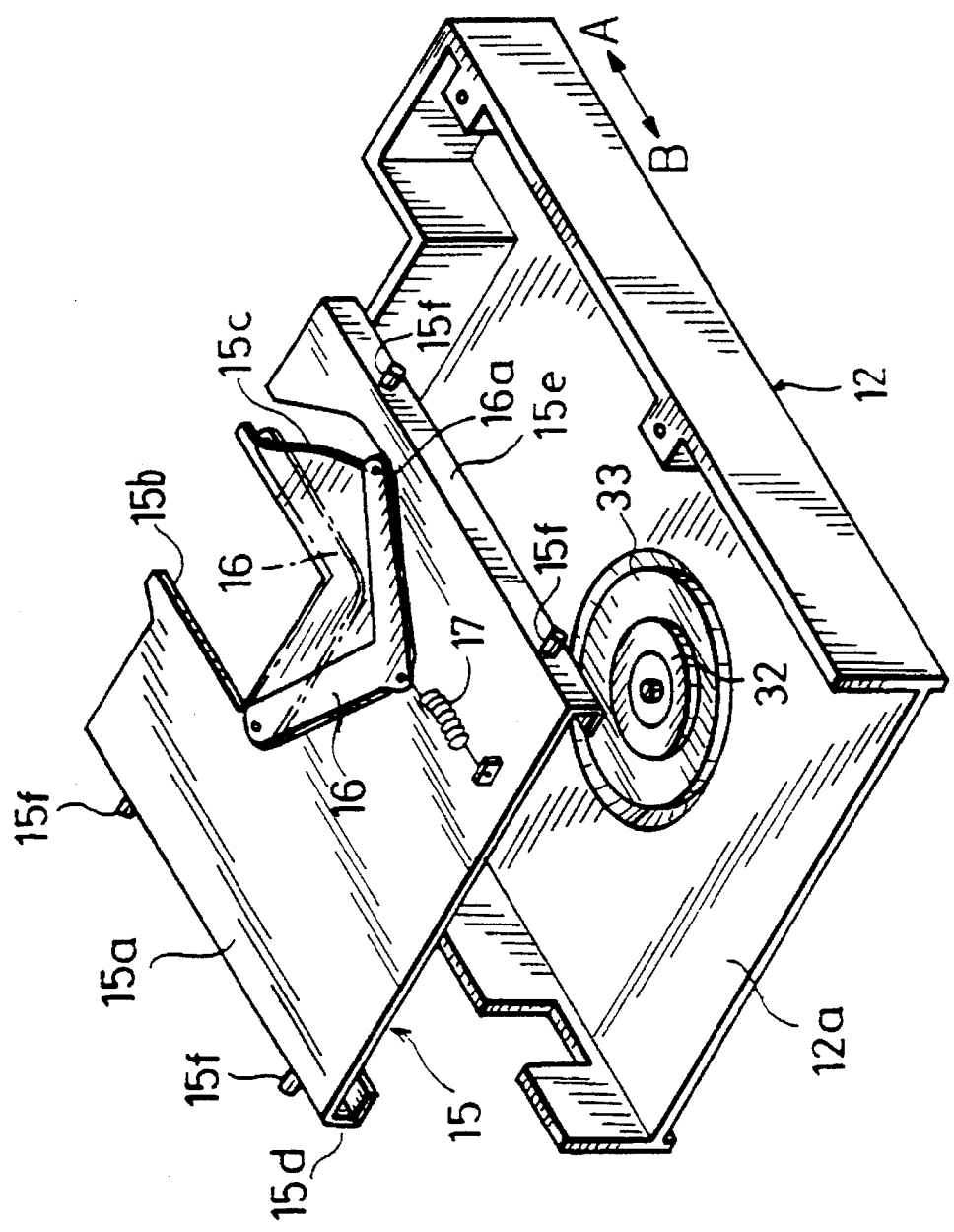
FIG. 9 shows an exploded perspective view of the holder and a frame of the disc apparatus of FIG. 4.

This burying of the motor 33 in the bottom plate of the frame 12 enables a disc placing surface 32a of the turn table 32 to be lowered so that the disc placing surface 32a is brought nearer to the top surface 12a of the bottom plate of the frame 12 as shown in FIGS. 9 and 10. That is, the height of the disc placing surface 32a projecting from the bottom plate of the frame 12 is reduced by this motor-burying construction. As a result, the magnetic disc 13, which is placed on the turn table 32 while being loaded in the disc apparatus 11 can be lowered so that it is positioned nearer to the bottom plate of the frame 12. This construction along with the above-mentioned construction in which the holder 15 is lowered enables the thickness of the disc apparatus 11 to be reduced.

Operation of the disc apparatus 11 having the construction mentioned above will now be described.

FIG. 10 shows a state of the disc apparatus 11 before the cartridge 14 is inserted into the disc apparatus 11. In this state, the slider 24 is kept at a disc insertion/ejection position as a result of the slider moving in the direction A. Further, in this state, the head arm 21 having the upper magnetic head 22 is at the disc insertion/ejection position as a result of being raised together with the holder 15.

When the cartridge 14, indicated by a chain line in FIGS. 6 and 10, is inserted into the holder 15 which is at the insertion/ejection position, the cartridge 14 advancing along the direction A. As a result, the advanced end of the advancing cartridge 14 comes in contact with and then pushes the abutting portion 29a of the latch lever 29 in the direction A. As a result of this pushing, the latch lever 29 pivots in the clockwise direction (the reverse of the direction D in FIG. 6) so that the engaging portion 29b is moved apart from the engaging nail 24e of the slider 24. Thus, the engaging portion 29b no longer prevents the movement of the slider 24. As a result, the slider 24 is slid in the direction B by the pulling force of the spring 28.

During this sliding movement of the slider 24, the slider 24 stably moves while being hung on the cover member 23 by the four guiding pins 26. Simultaneously, the ejecting button 27 mounted on the mounting portion 24g slides on the guiding portions 23h of the cover member 23 through the grooves 27d and 27e, the guiding portions 23h guiding the sliding movement of the ejecting button 27. Thus, like the slider 24, the ejecting button 27 also moves in the direction B.

Figure 21:
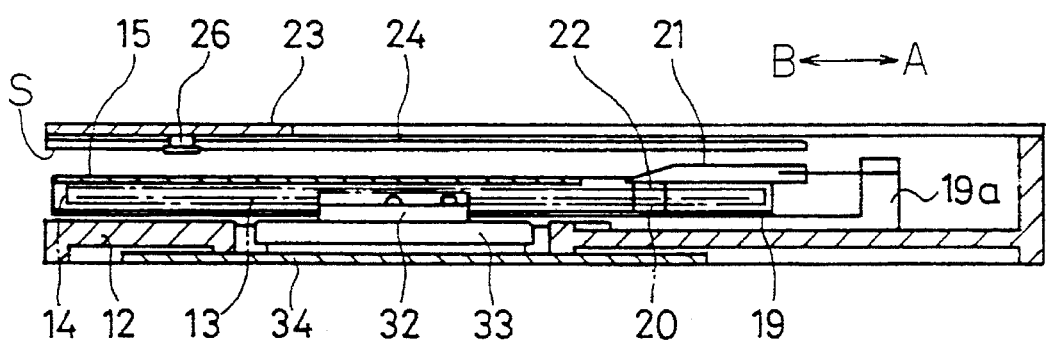
FIG. 21 shows a side elevational sectional view of the disc apparatus of FIG. 4 in a state where the cartridge has been loaded therein.

The respective projection pins 15f engage with the respective oblique slits 24f formed in the side plates 24b and 24c of the cover member 24. This engagement causes the holder 15 to be lowered in response to the B directional movement of the slider 24. More particularly, the B directional movement of the slider 24 causes the same movement of the oblique slits 24f to move in the same direction. The B directional movement of the oblique slits 24f results in the corresponding respective projection pins 15f being lowered along the guiding cut-outs 23d, as shown in FIG. 8, to lower the holder 15. This lowering of the holder 15 results in the holder 15 reaching the disc loading position shown in FIG. 21.

As a result of the lowering of the holder 15, the magnetic disc 13 in the cartridge 14 is lowered together with the cartridge 14 so that the disc 13 is placed on the turn table 32.

Simultaneously, the lowering of the holder 15 causes the head arm 21 to pivot in the counter-clockwise direction by the pushing force of the torsion spring 19c. As a result, the upper magnetic head 22 is lowered together with the head arm 21. The above-mentioned shutter (not shown in the drawings) of the cartridge 14 is being opened while the cartridge 14 is inserted into the holder 15. This shutter is used to close openings formed on the cartridge 14, which openings are used for allowing the magnetic heads 20 and 22 to come in contact with the magnetic disc 13. More particularly, the shutter is opened by the pin 16a of the lever 16 shown in FIG. 6, which lever 16 pivots in the counter-clockwise direction so that the pin 16a engages with the shutter so as to open it. Thus, the respective magnetic heads 20 and 22 come in contact with the respective recording surfaces of the magnetic disc 13 while the disc 13 is placed on the turn table 32.

Then, after the turn table 32 turns as a result of being driven by the motor 33, the disc 13 turns together with the turn table 32 so that data is magnetically recorded on and/or read from the disc 13 through the magnetic heads 20 and 22.

The ejecting operation by which the magnetic disc 13 loaded in the disc apparatus 11 is ejected therefrom together with the cartridge 14 will now be described.

First, an operator pushes the ejecting button 27 in the direction A. In response to this pushing action, the ejecting button 27 stably moves along the direction A without any vertical shaking thereof. Such stable movement of the ejecting button 27 is ensured, even though there is no wall provided in the front bezel 35 at the top of the ejecting button 27 for guiding the movement of the ejecting button 27. This is because the movement of the ejecting button 27 is instead guided by the guiding portions 23h of the cover member 23 which respectively engage with the grooves 27d and 27e formed on the ejecting button 27.

This A directional movement of the ejecting button 27 causes the slider 24 to also slidingly move along the direction A. As a result, the holder 15 is raised so that it reaches the insertion/ejection position by means of the mutual engagement among the projection pins 15f, the oblique slits 24f and the guiding cut-outs 23d. The A directional movement of the slider 24 allows the latch lever 29 to be pivoted in the direction D by the pushing force of the torsion spring 31. As a result of this pivoting of the lever 29, the engaging portion 29b of the lever 29 engages with the engaging portion 24e of the slider 24. Thus, the engaging portion 29b prevents the slider from moving in the direction B. This D directional pivoting of the latch lever 29 causes the abutting portion 29a of the latch lever 29 to push the end of the cartridge 14 in the holder 15, which end is located farther from the operator, in the direction B. As a result, the cartridge 14 is ejected.

Figure 23:
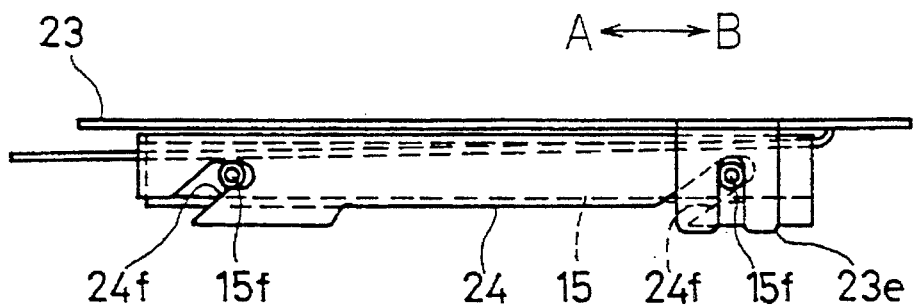
FIG. 23 shows a left-side elevation view of the cover member, slider and holder of the disc apparatus of FIG. 4.

As shown in FIGS. 22 and 23, the slider 24 is hung on the bottom of the cover member 23 so that the slider 24 can slidingly move. Further, the projection pins 15f of the holder 15 engage with the oblique slits 24f of the slider 24 so that the holder is supported by the slider 24. Thus, the cover member 23, slider 24 and holder 15 are assembled together integrally. Further, the latch lever 29 supported on the cover member 23 is biassed in the direction D by the force of the torsion spring 31. Simultaneously, the latch lever 29 prevents the slider 24, by the engaging portion 29b engaging with the engaging nail 24e, from sliding and moving.

Further, the slider 24 is biassed in the direction B by means of the coil spring 28 extended lengthwise between the slider 24 and the cover member 23. As a result, the engaging nail 24e is pushed by the engaging portion 29b of the latch lever 29. By such a construction, the projection pins 15f are prevented from being disengaged from the oblique slits 24f of the slider 24.

As mentioned above, it is possible to integrate the slider 24, ejecting button 27, latch lever 29, and springs 28 and 31 with the cover member 23 by fastening them together. As a result, the process for assembling the disc apparatus of the present invention is speedier and more efficient than that of the related art.

Figure 24A:
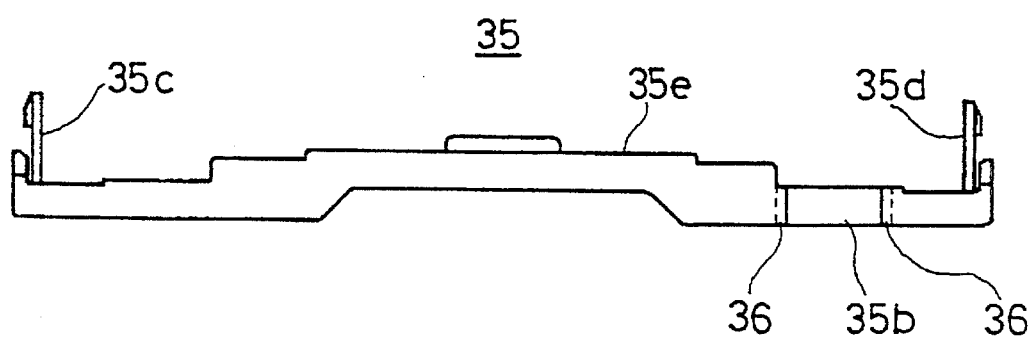
FIGS. 24A and 24B respectively show a plan view and front elevation view of another front bezel of the disc apparatus of FIG. 4, which front bezel is a modification of the front bezel of FIGS. 18A and 18B.
Figure 24B:
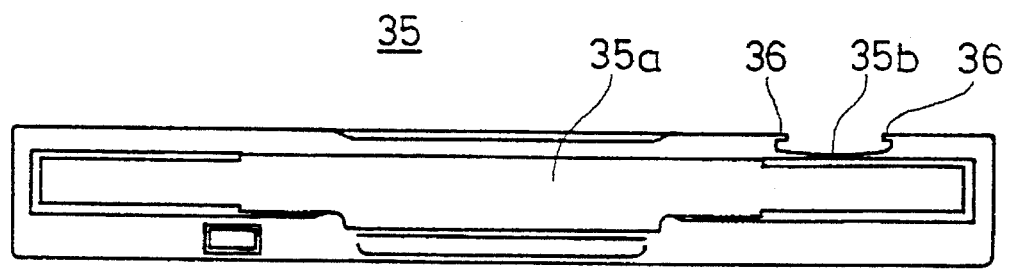

An example of a disc apparatus resulting from modifying the above-mentioned embodiment of the disc apparatus 11 according to the present invention will now be described with reference to FIGS. 24A and 24B.

The above-mentioned modification comprises the additional provision of guiding portions 36 at the top part of both ends of the concavity 35b of the front bezel 35. Each of these guiding portions 36 projects inside of the concavity 35b. These guiding portions 36 are used for respectively engaging the grooves 27d and 27e of the ejecting button 27 so as to guide the A/B directional movement of the ejecting button 27 and so as to enhance the vertical strength of the ejecting button 27. These functions of the guiding portions 36 are the same as the functions of the guiding portions 23h of the cover member 23. As a result, it is no longer necessary to provide the guiding portions 23h of the cover member 23.

The present invention is not limited to a magnetic disc apparatus such as the above-mentioned disc apparatus 11. The present invention can be applied to another disc apparatus such as an optical disc apparatus and magneto-optical disc apparatus.

Summarizing the above, the disc apparatus according to the present invention has a guiding portion either on the cover portion or on the front bezel thereof. (The following description will be based on the assumption that a direction along which a data recording surface of a data recording disc to be loaded in the disc apparatus extends is a horizontal direction. This assumption corresponds to the construction of the above mentioned embodiment of the disc apparatus 11. However, it should be noted that the direction along which a recording surface of a recording disc to be applied to the disc apparatus according to the present invention extends merely depends on which direction the disc apparatus is viewed from. The disc apparatus according to the present invention can be placed to extend in any direction and thus expressions concerning directions indicating the construction of the disc apparatus will vary depending on the particular direction along which the disc apparatus extends.) Such a guiding portion as mentioned above guides the forward/backward movement of the ejecting button, the guiding portion being engaged with the side of the ejecting button. This guiding portion thus prevents the ejecting button from shaking vertically during the forward/backward movement thereof. Such an arrangement of the guiding portion enables the ejecting button to be placed above the disc inserting hole of the front bezel, thus making it unnecessary to provide another guiding portion above the ejecting button on the front bezel so as to guide the movement of the ejecting button. This is because the guiding portion engaged with the side of the ejecting button according to the present invention can perform the function the guiding portion provided above the ejecting button in the related art.

This construction according to the present invention in which the guiding portion is engaged with the side of the ejecting button enables a miniaturization as well as reduction in the thickness of the disc apparatus. Such an advantage obtained by the present invention contributes to miniaturization of various electronic equipment units such as a personal computer.

Further, the present invention is not limited to the above described embodiments, and variations and modifications may be made without departing from the scope of the present invention.

What is claimed is:

1. A disc apparatus comprising:
    a holder for inserting therein a cartridge containing a disc having a planar disc surface;
    a sliding member having an operating member under the control of a user with the operating member extending outwardly from the sliding member along a direction substantially parallel to the planar disc surface, wherein said sliding member slides along a direction in response to insertion of the cartridge into said holder so as to move said holder into a loading position, wherein said sliding member slides along another direction in response to operation of said operating member by the user so as to move said holder into an insertion/ejection position, and wherein said disc apparatus accesses the disc in a condition in which said holder is in said loading position and the user either takes out the cartridge from said disc apparatus or inserts the cartridge containing the disc into said disc apparatus in a condition in which said holder is in said insertion/ejection position;
    a guiding portion for guiding the movement of said operating member along a side of said operating member, with said operating member having a groove extending along said side for receiving said guiding portion to form a tongue and groove coupling, wherein said side of said operating member lies in a direction extending substantially parallel to the disc surface and wherein said guiding portion restricts a movement of said operating member along a direction perpendicular to the planar disc surface;
    and a supporting member for supporting said holder and said sliding member in an operating relationship relative to one another wherein said guiding portion comprises a part of said supporting member.

2. The disc apparatus according to claim 1, further comprising:

a front member fixed substantially on said disc apparatus, wherein said front member has an insertion hole through which either the cartridge is ejected from said disc apparatus or the cartridge containing the disc is inserted into said disc apparatus; and a turntable for rotating the disc placed on a placement surface thereof;

and wherein said sliding member and supporting member are located in a first zone at one end of a second zone, said end of said second zone being located along a direction perpendicular to the disc surface and in the direction to which said placement surface of said turntable faces, said second zone being a zone formed of a surface extending from said insertion hole along a direction substantially parallel to the disc surface.

3. The disc apparatus according to claim 2, wherein said operating member is located in said first zone.

4. A disc apparatus comprising:

a holder for inserting therein a cartridge containing a disc having a planar disc surface;

a sliding member having an operating member under the control of a user with the operating member extending outwardly from the sliding member along a direction substantially parallel to the planar disc surface, wherein said sliding member slides along a direction in response to insertion of the cartridge into said holder so as to move said holder into a loading position, wherein said sliding member slides along another direction in response to operation of said operating member by the user so as to move said holder into an insertion/ejection position, and wherein said disc apparatus accesses the disc in a condition in which said holder is in said loading position and the user either takes out the cartridge from said disc apparatus or inserts the cartridge containing the disc into said disc apparatus in a condition in which said holder is in said insertion/ejection position;

a guiding portion for guiding the movement of said operating member along a side of said operating member, with said operating member having a groove extending along said side for receiving said guiding portion to form a tongue and groove coupling, wherein said side of said operating member lies in a direction extending substantially parallel to the disc surface and said guiding portion restricts a movement of said operating member along a direction perpendicular to the planar disc surface; and a front member fixed substantially on said disc apparatus, wherein said front member has a insertion hole through which either the cartridge is ejected from said disc apparatus or the cartridge containing the disc is inserted into said disc apparatus, wherein said guiding portion comprises a part of said front member.

5. The disc apparatus according to claim 4, wherein:

said front member has a concavity, on a surface of which concavity said operating member slides in response to said operating member being operated by the user; and said guiding portion comprises a projection formed either at or near an edge of said concavity.

6. The disc apparatus according to claim 4, further comprising a turntable for rotating the disc placed on a placement surface thereof;

and wherein said sliding member is located in a first zone at one end of a second zone, said end of said second zone being located along a direction perpendicular to said disc surface and in the direction to which said placement surface of said turntable faces, said second zone being a zone formed of a surface extending from said insertion hole along a direction substantially parallel to the disc surface.

7. The disc apparatus according to claim 6, wherein said operating member is located in said first zone.

8. A disc apparatus comprising:

a holder for inserting therein a cartridge containing a disc having a planar disc surface;

a sliding member having an operating member under the control of a user with the operating member extending outwardly from the sliding member along a direction substantially parallel to the planar disc surface, wherein said sliding member slides along a direction in response to insertion of the cartridge into said holder so as to move said holder into a loading position, wherein said sliding member slides along another direction in response to operation of said operating member by the user so as to move said holder into an insertion/ejection position, and wherein said disc apparatus accesses the disc in a condition in which said holder is in said loading position and the user either takes out the cartridge from said disc apparatus or inserts the cartridge containing the disc into said disc apparatus in a condition in which said holder is in said insertion/ejection position; and a guiding portion for guiding the movement of said operating member along a side of said operating member, with said operating member having a groove extending along said side for receiving said guiding portion to form a tongue and groove coupling, wherein said side of said operating member lies in a direction extending substantially parallel to the disc surface and wherein said guiding portion restricts a movement of said operating member along a direction perpendicular to the disc surface.

* * * * *